Jan. 26, 1926.

A. A. WICKLAND ET AL 1,570,658

MOLDING MACHINE

Filed Oct. 10, 1919 10 Sheets-Sheet 1

Jan. 26, 1926.　　　　　　　　　　　　　　　　　1,570,658
A. A. WICKLAND ET AL
MOLDING MACHINE
Filed Oct. 10, 1919　　　10 Sheets-Sheet 3

Jan. 26, 1926.  
A. A. WICKLAND ET AL  
MOLDING MACHINE  
Filed Oct. 10, 1919  10 Sheets-Sheet 4

1,570,658

Jan. 26, 1926.　　　　　　　　　　　　　　　　　　1,570,658
A. A. WICKLAND ET AL
MOLDING MACHINE
Filed Oct. 10, 1919　　　10 Sheets-Sheet 5
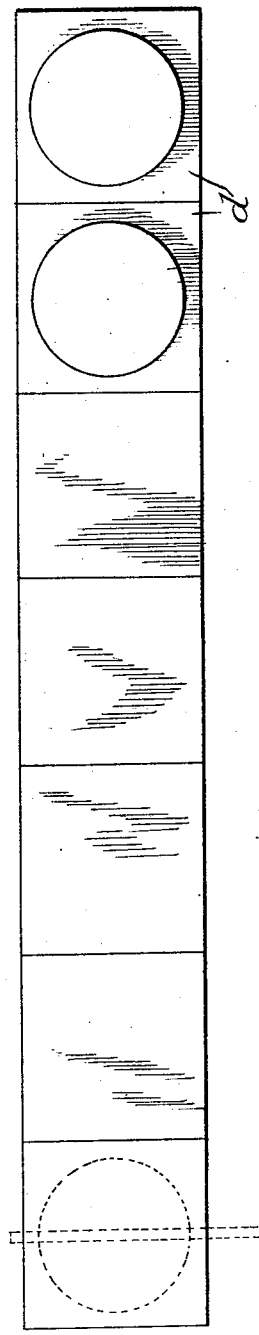
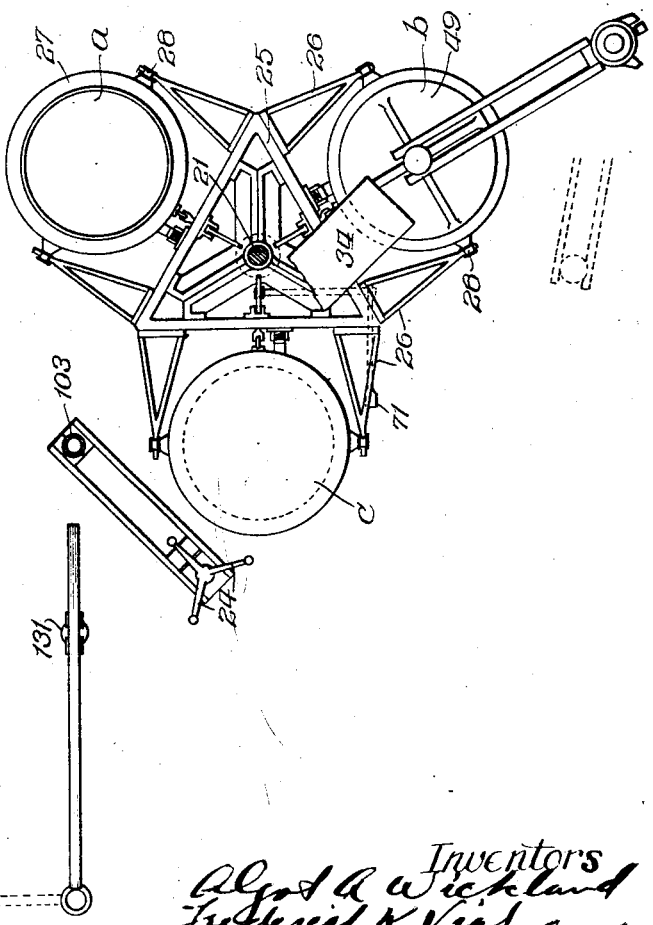
Fig.5

Jan. 26, 1926. 1,570,658
A. A. WICKLAND ET AL
MOLDING MACHINE
Filed Oct. 10, 1919 10 Sheets-Sheet 6
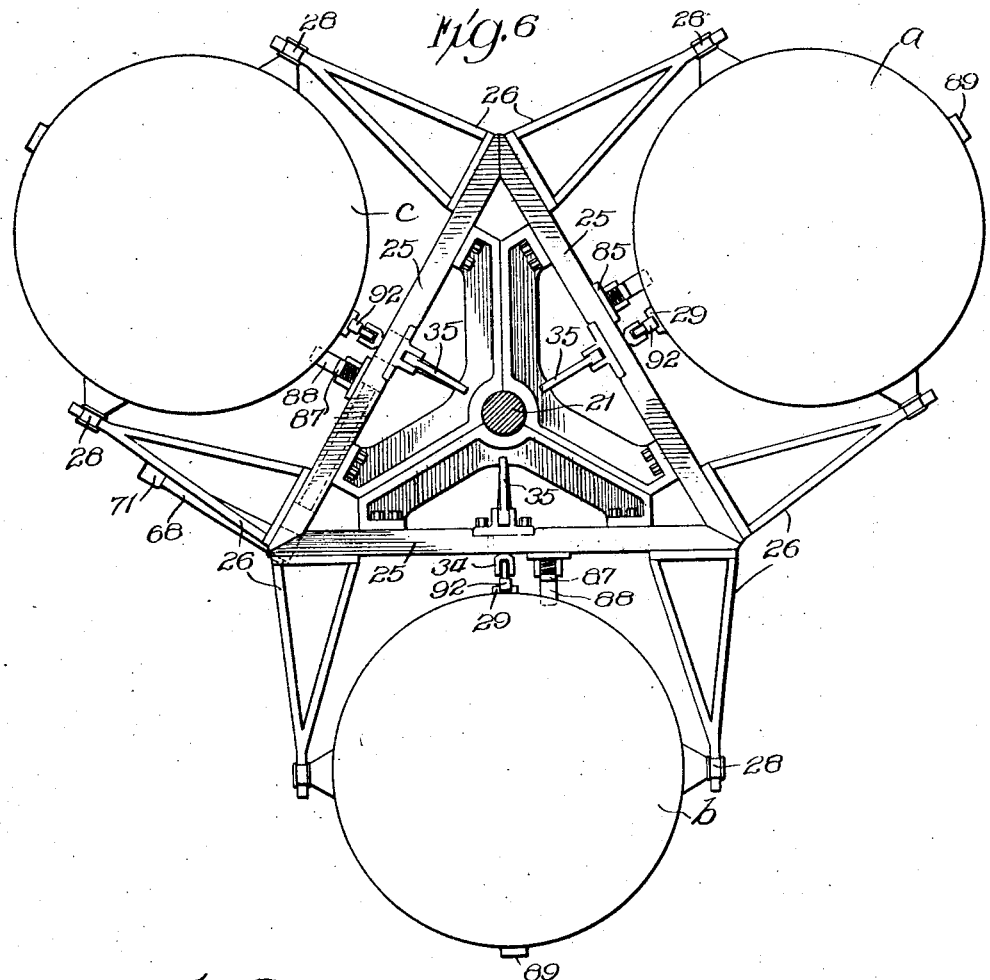
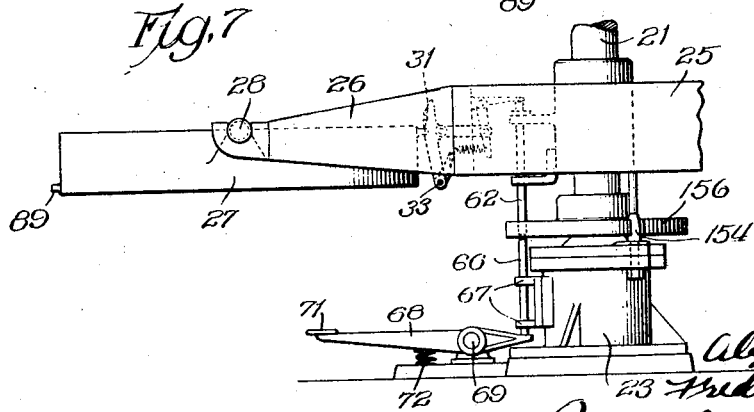

Jan. 26, 1926.  A. A. WICKLAND ET AL  1,570,658
MOLDING MACHINE
Filed Oct. 10, 1919  10 Sheets-Sheet 7
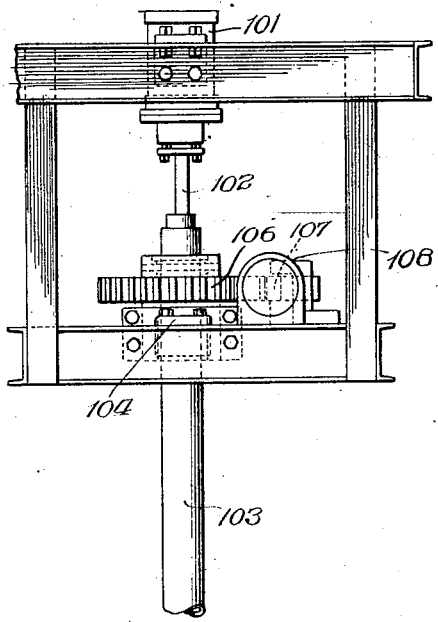
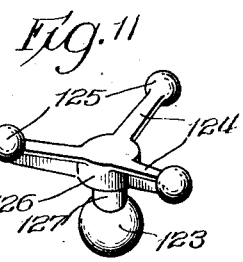
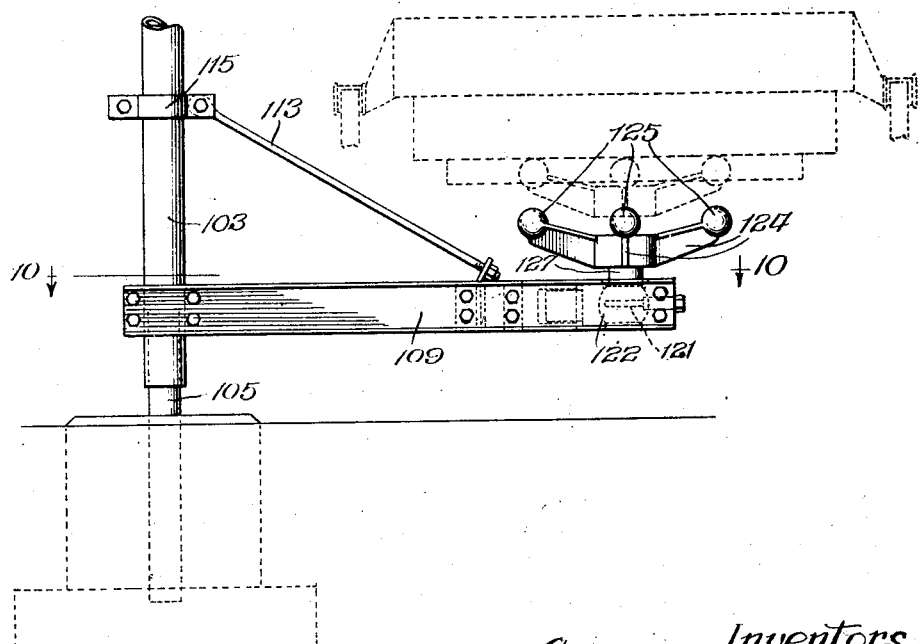
Inventors
Algot A. Wickland
Frederick A. Vial
By Munday, Clarke
& Carpenter Atty's

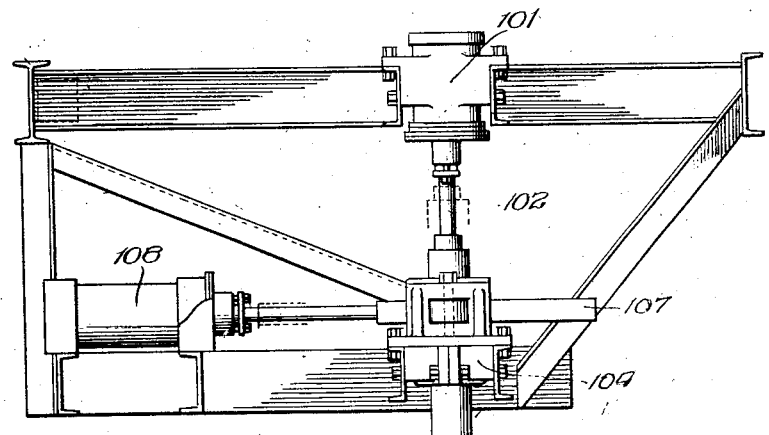
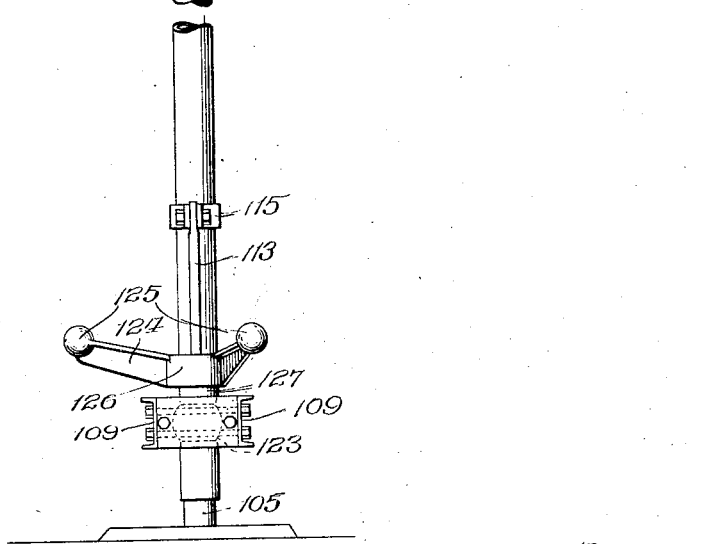
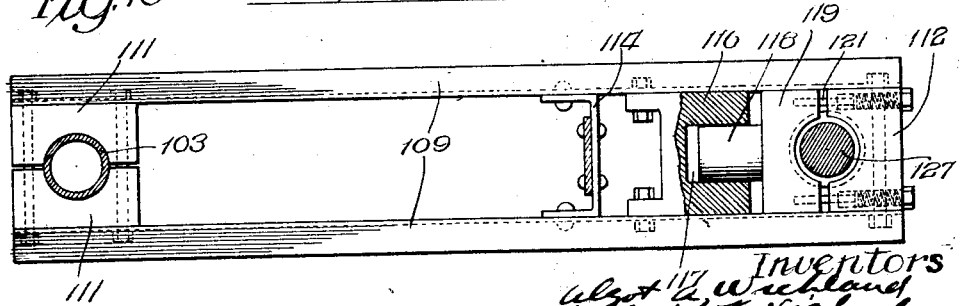

Jan. 26, 1926. 1,570,658
A. A. WICKLAND ET AL
MOLDING MACHINE
Filed Oct. 10, 1919 10 Sheets-Sheet 9
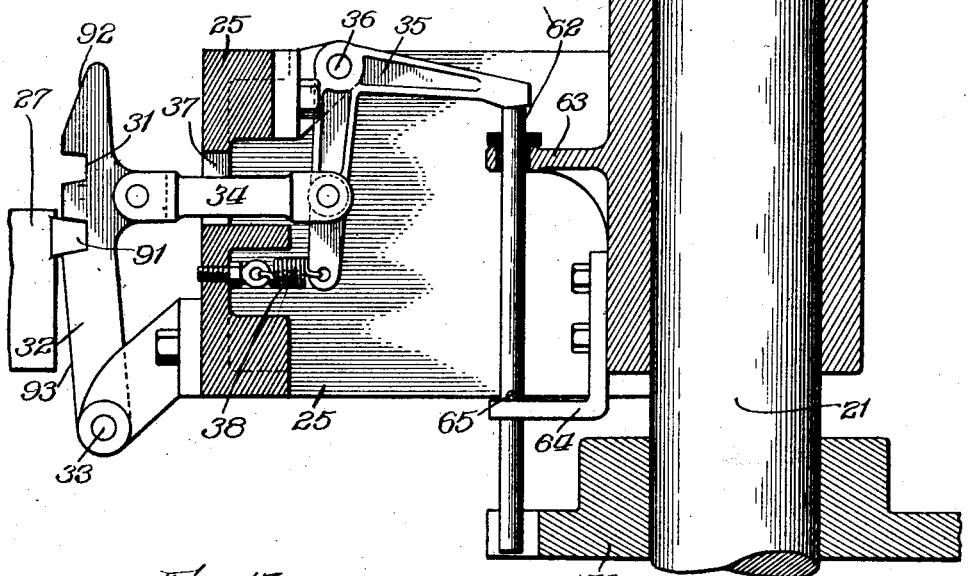
Fig. 12
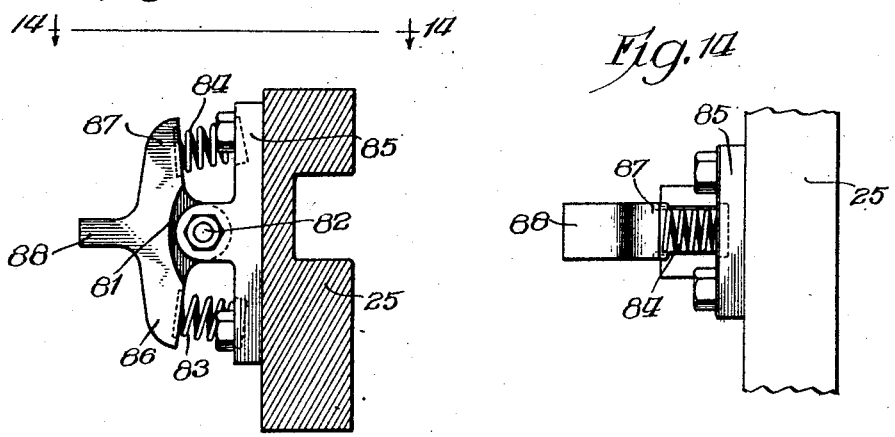
Fig. 13
Fig. 14

Jan. 26, 1926.　　　　　1,570,658
A. A. WICKLAND ET AL
MOLDING MACHINE
Filed Oct. 10, 1919　　10 Sheets-Sheet 10
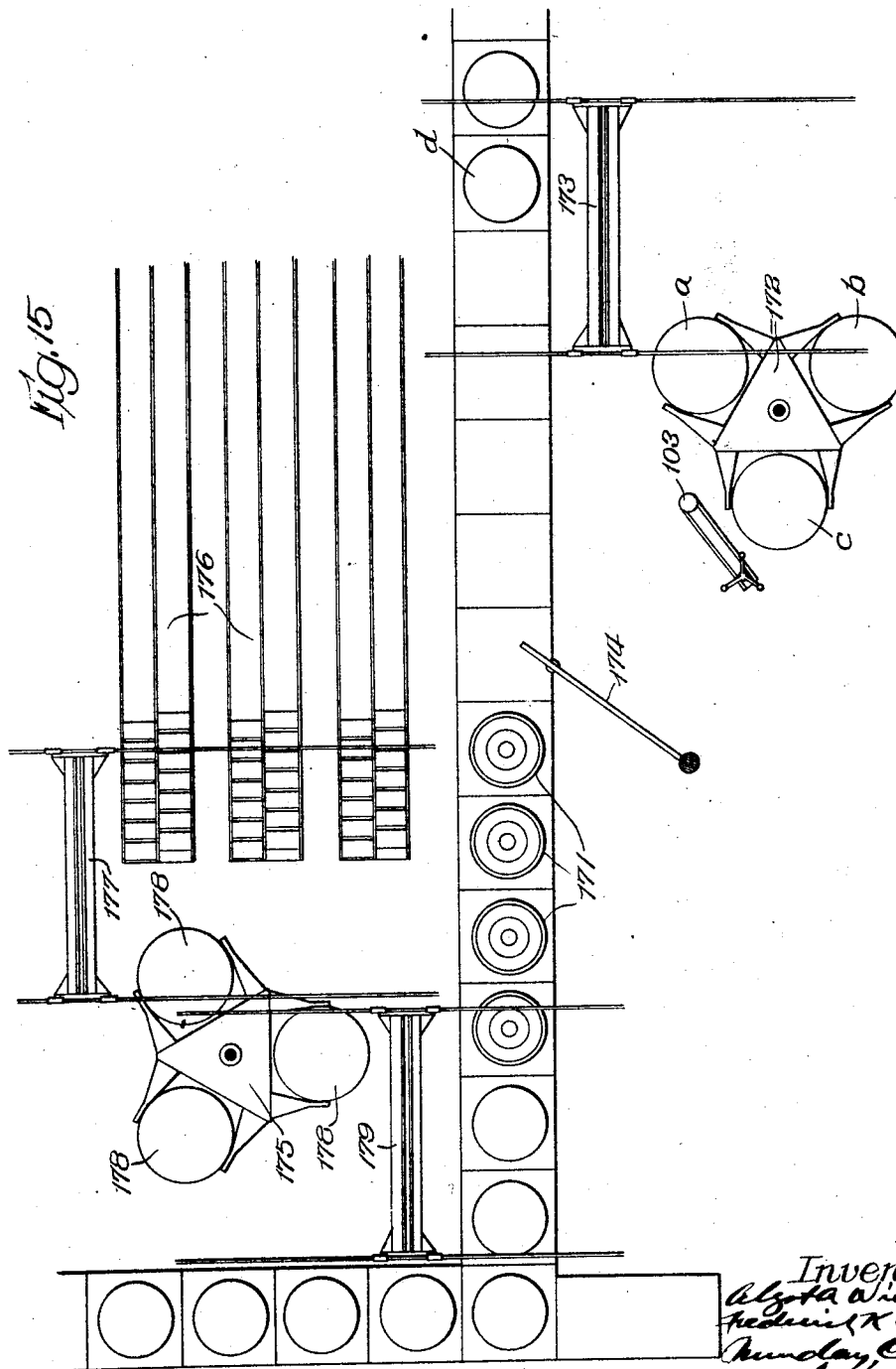

Patented Jan. 26, 1926.

1,570,658

UNITED STATES PATENT OFFICE.

ALGOT A. WICKLAND, OF CHICAGO, AND FREDERICK K. VIAL, OF LA GRANGE, ILLINOIS, ASSIGNORS TO GRIFFIN WHEEL COMPANY, OF CHICAGO, ILLINOIS, A CORPORATION OF MASSACHUSETTS.

MOLDING MACHINE.

Application filed October 10, 1919. Serial No. 329,682.

*To all whom it may concern:*

Be it known that we, ALGOT A. WICKLAND and FREDERICK K. VIAL, citizens of the United States, residing in Chicago and La Grange, respectively, in the county of Cook and State of Illinois, have invented a new and useful Improvement in Molding Machines, of which the following is a specification.

This invention relates in general to the art of molding and has for its object broadly the provision of an improved apparatus and process.

A principal object of the invention is the provision of an apparatus and a process or method of using the same all to permit of the formation of the molds in accordance with an extremely rapid and carefully adjusted cycle of operation.

Another important operation is the provision of an apparatus which will eliminate much of the manual labor heretofore required in the forming of foundry molds.

Another important object of the invention is the provision of a molding machine which will permit the attendants to specialize in the performance of certain operations and which will also permit these attendants to perform said operations concurrently upon successive molds.

Another object of the invention is the provision of a molding machine provided with new and improved mechanism and devices for supporting the molds during forming, for feeding the sand into the molds, for compressing the sand after it is fed, for inverting the molds, for drawing the patterns, and for removing the molds from the zone of action of the machine.

Another and highly important object of the invention is the provision of a molding machine which may be operated in connection with a continuously advancing conveyer which brings the flask parts or which may bring them to the machine and which carries away the finished molds to the pouring and shake-out stations. The invention contemplates also in this connection the provision of a machine readily accommodating itself to the operation of such a conveyer when the conveyer is operated in accordance with a nicely adjusted and highly efficient cycle of foundry action.

The invention has for a further highly important object the provision of a machine which will permit of a maximum output for labor, and apparatus and floor space involved. The invention contemplates in this connection the provision of a machine and a process for operating it which will permit the total work of constructing the molds to be evenly or substantially evenly divided between a number of operating stations to the end that successive molds may be worked upon, either manually or by the machine itself, at the several stations in substantially equal time amounts.

Numerous other objects and advantages of the invention will be apparent as it is better understood from the following description, which considered in connection with the accompanying drawings illustrates a preferred embodiment thereof.

On the drawing,

Fig. 5 is a horizontal section;

Fig. 6 is an enlarged plan detail of the turret;

Fig. 7 is a side elevation of one of the mold supports and attendant parts, certain portions being broken away;

Fig. 8 is a side elevation of the mold removing mechanism;

Fig. 9 is a view taken at right angles to the view in Fig. 8;

Fig. 10 is a section taken substantially on the line 10—10 of Fig. 8;

Fig. 11 is a perspective view of the removing mold support;

Fig. 12 is a vertical section through the mold locking mechanism;

Fig. 13 is a side elevation of the stop device for limiting the movement of the mold support when the mold support is reversed in position;

Fig. 14 is a view of the same looking in the direction of the arrows 14—14 in Fig. 13; and Fig. 15 is a top plan diagrammatic view of the molding machine and a portion of the conveyor system employed to illustrate the adjustment of the molding machine into the cycle of operation of a foundry conveyor apparatus.

Figure 1:
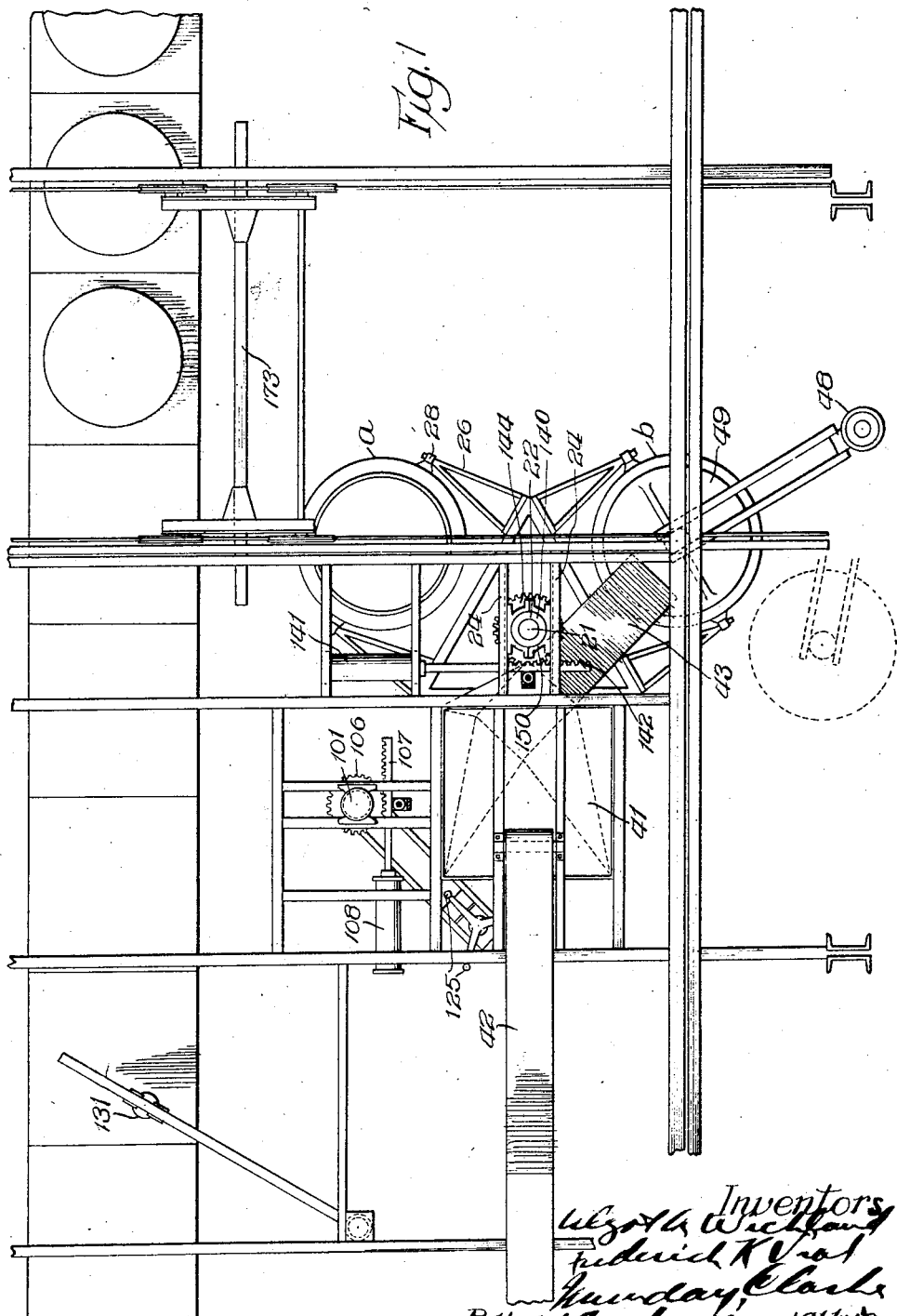
Fig. 1 is a top plan view of a machine embodying my present invention.
Figure 2:
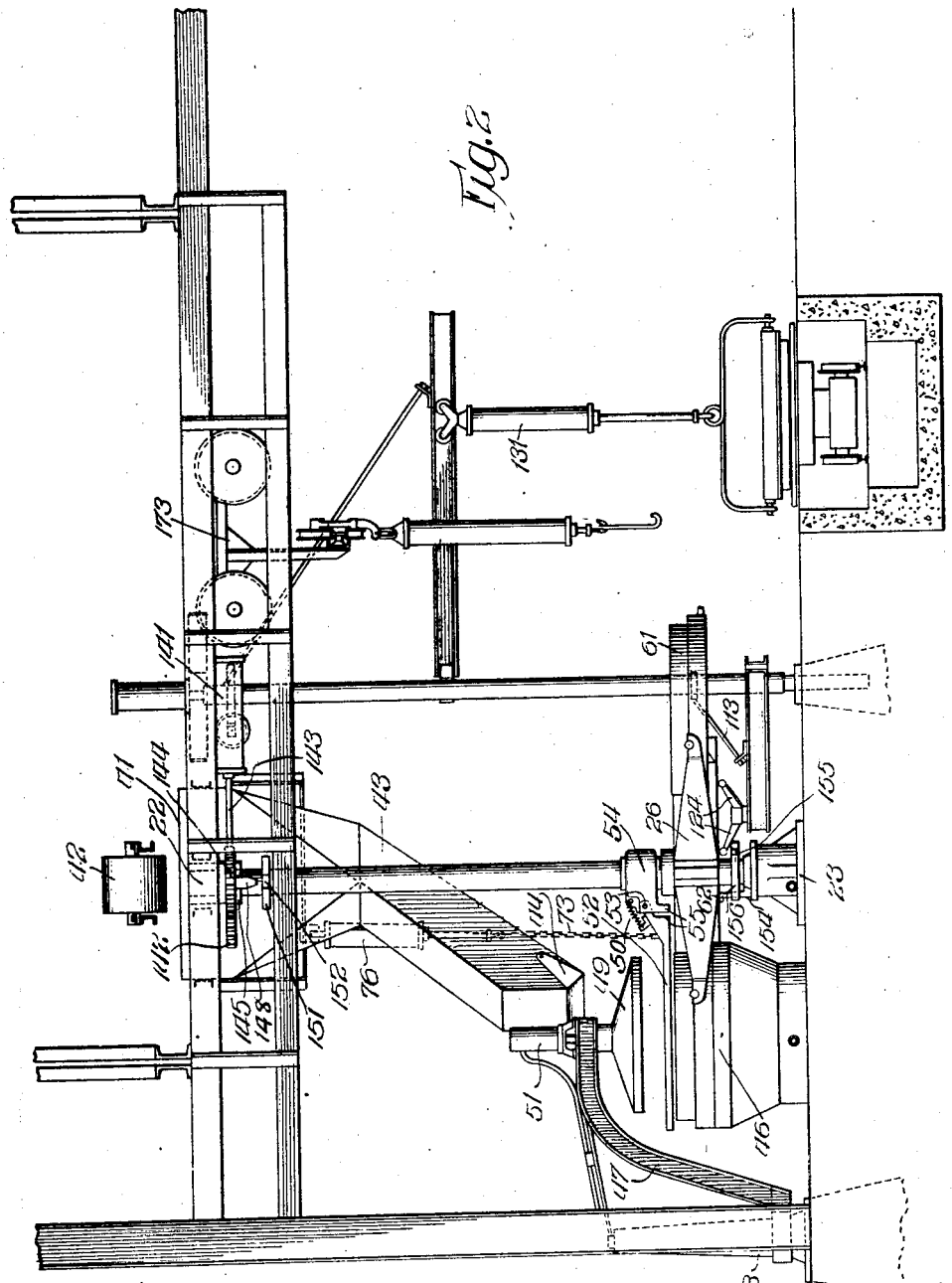
Fig. 2 is a side elevation thereof looking from the right of Fig. 1.
Figure 3:
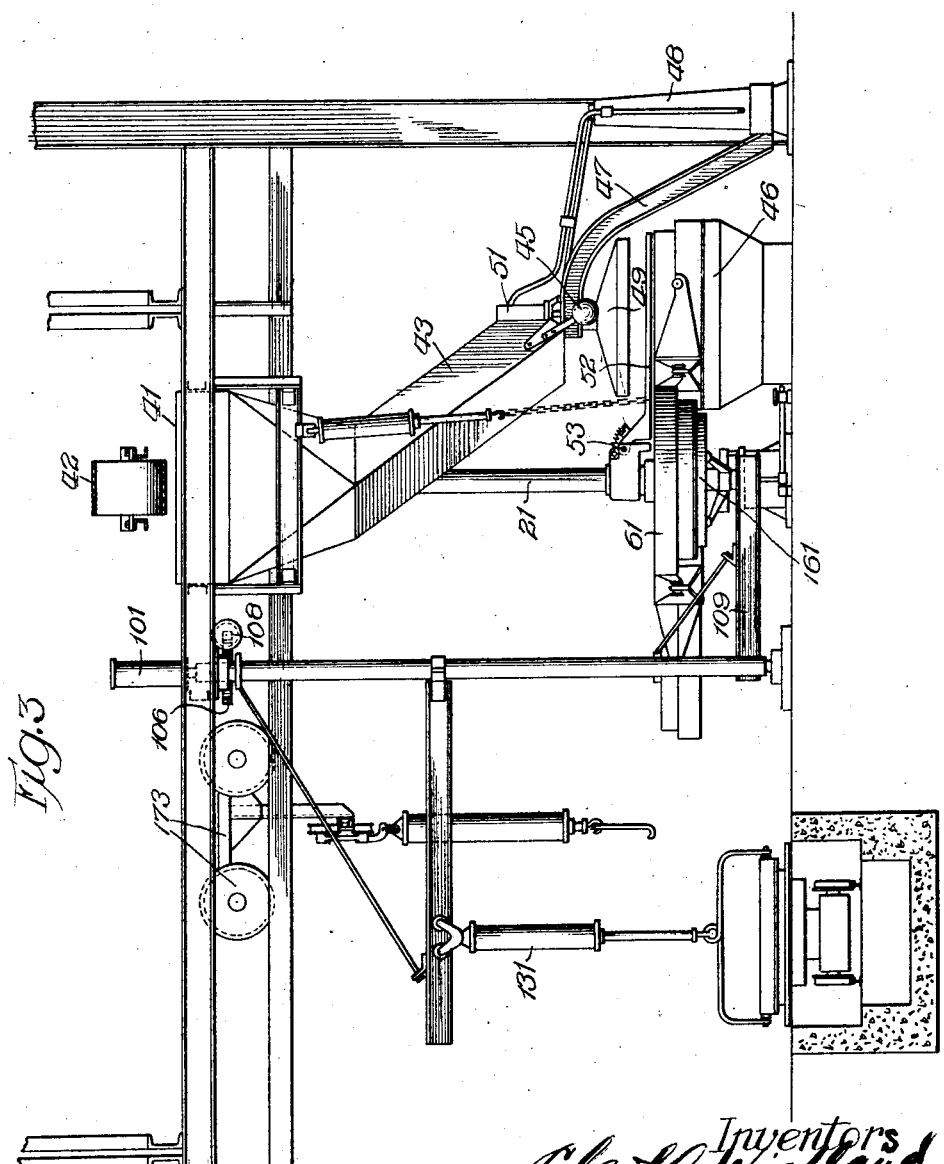
Fig. 3 is a similar view looking from the left of Fig. 1.

The machine shown on the drawing for the purpose of illustrating the present invention includes a conveyor or turret having three mold supports, i. e. arranged to carry three molds or flasks at one time and to present these molds to three operating stations at each of which stations some portion of the molding is performed.

This turret is arranged alongside a conveyor system which, although not entirely shown on the drawing, may be considered to be a part of a system for co-ordinating the various steps and operations involved in, or as an incident to the production of the finished castings and it will be considered that this conveyor system brings the flask and pattern parts to the molding machine and carries away the finished molds, although of course the flask and pattern parts and the finished molds themselves may be otherwise transported from a number of aspects of the invention.

The illustrative structure shown on the drawing will now be described in detail. A vertical shaft 21 is provided to support the turret and this shaft has bearings 22 and 23 at its top and bottom respectively. The bottom bearing 23 is mounted upon the floor of the foundry in what may be considered the base of the machine and the bearing 22 is mounted overhead in any suitable fashion being shown in the present instance as supported by two structural metal members 24 forming a part of an overhead framework. This framework will not be described in detail since its particular construction is unnecessary to the understanding of the invention. Mounted upon the shaft 21 is a triangular frame 25 from each of the three legs of which extend two arms 26 and in each pair of these arms a mold support 27 is carried. Each mold support is provided with a pair of outwardly extending trunnions or pivot shafts 28 which are adapted to rest in recesses located in the upper faces and near the ends of the arms.

Upon viewing Fig. 7 it will be noted that the trunnions 28 are located well up the sides of the mold supports so that when these supports are unloaded they naturally assume the position shown in this figure. Locking devices are provided for holding them in this position until it is desired to rotate them about their pivots to reverse the mold and draw the pattern. These locking devices are best shown perhaps in Fig. 12 from which it will be noted that a lug 29 extends out from the side of the mold support and is engaged in a recess 31 of a lever 32 pivoted at 33 on the triangular frame 25. This lever is connected by a link 34 with a bell crank 35 pivoted at 36 within the triangular frame, the link 34 passing through an aperture 37 in the frame. The arm of the bell crank to which the link 34 is connected is engaged by a spring 38 pulling the bell crank in a clockwise direction viewing Fig. 12 and maintaining the lock lever 32 in engagement with the lug 29.

It is intended that the mold support have the pattern fastened to it or formed integrally with it and that the flask be locked to it in any suitable fashion. The turret moves past three operating stations as already stated and at each of these a predetermined portion of the mold forming is accomplished. At the first station, namely that indicated by $a$, the pattern is cleaned, the number set, if numbers are to be employed, the flask part placed in position and locked and facing sand is riddled in and the pockets tucked. At the second station, that indicated at $b$, the flask part is filled with sand, and rammed, additional sand is added and rammed again, surplus sand is struck off and the bottom board placed in position and clamped. At the third station $c$, the mold is inverted, the pattern drawn, the mold placed on the conveyor to be carried to the pouring station (after having received its companion part) and the pattern plate or support is reverted to its normal position. These three operating stations and the mold supports are located at intervals of 120° about the center of the vertical shaft 21.

The operations performed at the station $a$ are preferably performed manually and by one or more attendants working constantly at this station. It will however be manifest that some or all of these operations or steps may be performed by automatic or semi-automatic agencies.

At the station $b$, the sand charge or charges forming the body or bulk of the mold is deposited in the flask part. This sand is delivered into a hopper 41 appropriately located in the framework above the machine by a conveyor belt 42 and from any suitable source. The bottom of the hopper is provided with a delivery chute 43 having a lower opening closed by a gate 44 arranged in position above the flask part when the flask part is at station $b$. The gate is provided with a weighted arm 45 normally maintaining the gate in closed position and adapted to be raised by an attendant to permit discharge of sand into the flask. After an appropriate amount of sand has been thus deposited in the mold, the mold is rammed or pressed. Mounted beneath the mold support is a vertically movable table 46 adapted to be raised by a suitable fluid pressure or other means to lift the mold and mold support slightly above the carrying arms 26. An arm 47 pivoted upon a support 48 is mounted adjacent to table 46 and this arm carries a head 49 adapted to be disposed over the sand body in the flask, and normally held up by a fluid pressure device 51. The head may be let down by the fluid pressure device to co-operate with the table in compacting the sand. During this action the lock for holding the mold against turning is released, as will be presently described.

Additional sand may now be added by swinging the arm 47 out of the way and again opening the gate 44. Thereafter this added sand may be pressed into place by again operating the table 46 and head 49. At this station the surplus sand is struck off by an arm 52 pivoted at 53 to a collar 54 on the shaft 21, this collar being freely movable about the shaft so that the arm may be swung across the top of the flask part to level it off. Co-operating shoulders 55 are provided upon the strike-off lever or arm 52 and the collar 54 to limit downward movement of the arm. A spring 50 also is provided to counterbalance with weight of the arm and hold it at a desired normal height.

The bottom board 61 is placed on the upper or exposed sand surface just before the mold leaves the station $b$, and this board is locked in place in any usual or preferred manner.

The inversion of the mold support and the mold carried by it will now be described. The arrival of the mold support at the station $c$ brings the locking mechanism which normally holds the mold support from turning into position for release. Referring again to Fig. 12, it will be noted that the free arm of the bell crank 35 is disposed above a rod 62 slidably mounted in bearings 63 and 64 in the triangular frame of the turret and normally supported by pin 65. When the turret presents a mold support at the station $c$, the lower end of this rod 62 is in registration with the upper end of a rod 66 vertically movable in bearing 67 on the base of the apparatus and resting upon an end of a lever 68 pivoted at 69 on the floor or on the base and arranged to be operated by an attendant stepping upon a pedal 71, a spring 72 being provided to hold the lever in the position shown in Fig. 7. Upward pressure on the rod 66 through the rod 62 actuates the bell crank and withdraws the locking lever 32. The mold support is now free to turn. The lock consisting of the lever 32 is released in similar manner at the station $b$ by engagement of the lower end of the rod 62 by a member located at this station $b$ in position to engage the rod when the turret is lowered in coming to rest. This releases the lock so that the compacting means may operate without interference.

Figure 4:
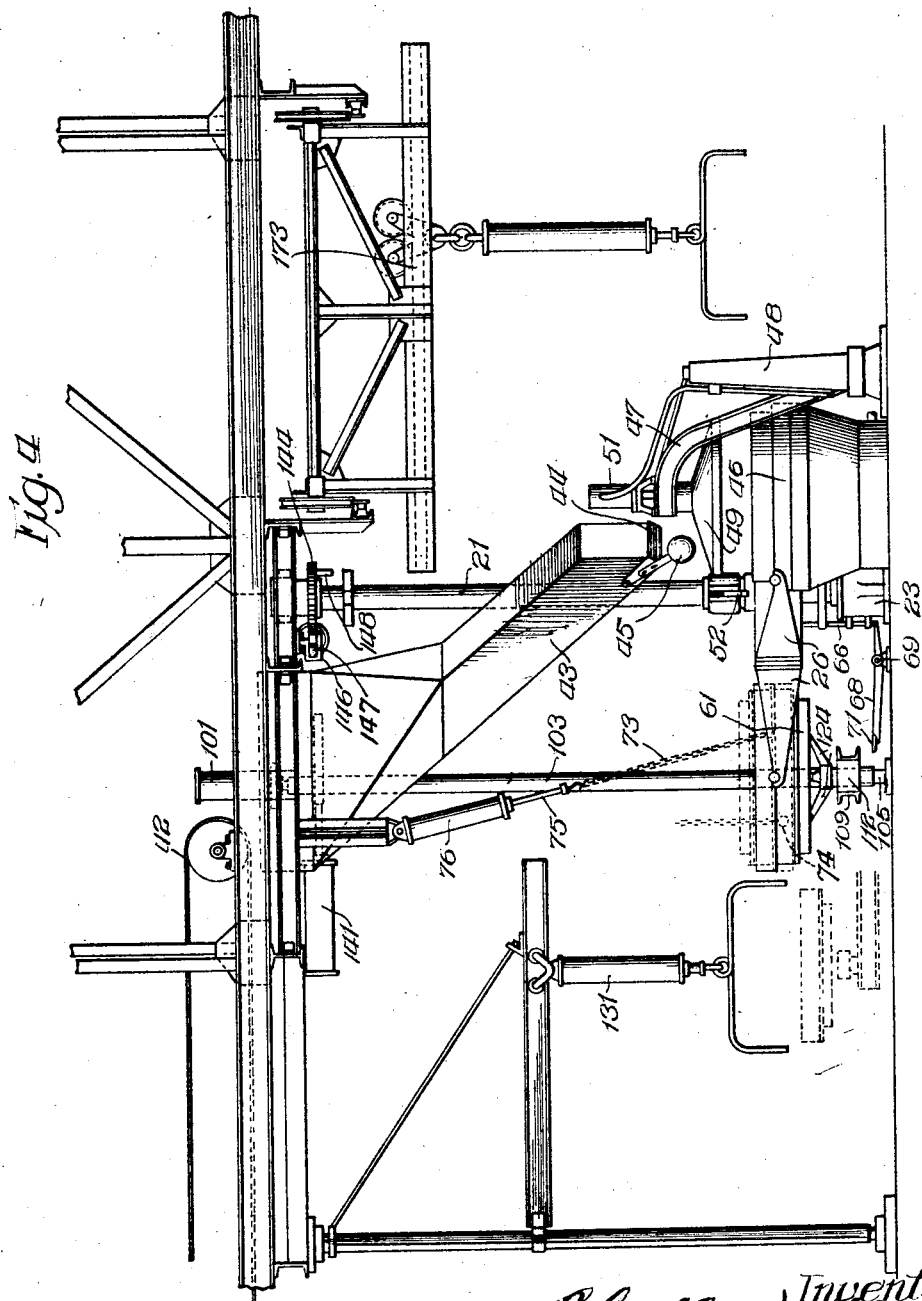
Fig. 4 is a similar view looking from the bottom in Fig. 1.

A chain 73 is attached to a pin or bolt 74 and this chain is also attached to a plunger rod 75 of a fluid pressure lift 76. The pin 74 is mounted off the center of the trunnions of the mold support and turns the mold support over when pulled upon by the chain 73 under the action of the fluid pressure lift. The lift cylinder acts as a brake to bring the inverted mold to rest after it has passed the vertical in its turning movement. An additional cushioning device or stop (Figs. 6, 13 and 14) is also provided and this stop acts also to bring the mold support locking devices gently into action as will be presently explained. The stop consists of a three arm lever 81 pivoted at 82 on the triangular frame and having balancing springs 83 and 84 disposed between a base 85 and lower and upper lever arms 86 and 87. The third or central arm 88 protrudes for engagement with the edge of the mold support when this edge arrives at or near the end of its swinging movement in either direction. Viewing Fig. 4, the mold support is swung from the dotted line position, which is the position before inversion of the mold, in a counter-clockwise direction to the full line position which is the inverted position and is then swung back to the dotted line position after the mold is removed. It has been stated that the trunnions are located at substantially the flask receiving face of the mold support so that the stop 81 is able to be engaged either above or beneath, depending upon the direction of swing of the mold support. Viewing Fig. 7, it will be noted that a lug 89 is provided on the opposite side of the mold support from lug 29 and a recess 91 is provided in the lock lever 32 to receive this lug and lock the mold support in an inverted position. The lock lever 32 is yieldingly held in locking position by the spring 38. The upper end of this lever is bevelled at 92 and the forward face of the lever beneath the recesses 31 and 91 is inclined at 93 to permit the lugs 29 and 89 to retract the lever and latch themselves in place.

The pattern is now drawn and the mold removed from beneath the mold support by mechanism to be now described, reference being had more particularly to Figs. 3, 5 and 8 to 11. A fluid pressure cylinder 101 is mounted in the overhead frame and has a piston rod 102 supporting a sleeve 103 slidably disposed through bearings 104 in the frame and having a bearing also upon an upwardly extending post 105 in the floor. Splined to the upper end of the sleeve is a gear 106 adapted to be actuated by a rack 107 in turn driven by a fluid pressure cylinder 108 mounted in the frame. At the bottom the sleeve carries an outwardly extending arm 109 composed of a pair of channels having blocks 111 tightly embracing the shaft or sleeve and a block 112 fixed between their outer or free ends. A brace 113 extending from a cross member 114 and a collar 115 on the sleeve 103 supports the arm in accurate horizontal position. A second block 116 is positioned between the channels and near their free ends. This block 116 is provided with a recess 117 into which a stem 118 of a sliding block 119 extends, this block being guided in a sliding horizontal movement by the stem and by pins 121 extending into it from the block 112. A spherical recess 122 is provided between the blocks 112 and 119 for the reception of a ball or spherical end 123 of a receiving support for the inverted mold. This support comprises three arms 124 having spherical ends 125 and extending out from a central body 126 from which body the stem 127 provided with the spherical end 123 extends down. The stem and blocks 112 and 119 form a ball and socket or universal joint. Before the mold is released from the mold support, after being inverted, the arm 109 is swung in beneath it by the fluid pressure cylinder 108 acting through the rack and gear 107 and 106. The arm is then lifted to bring the arms of the receiving support into three point engagement with the under face of the mold or more strictly speaking the under face of the bottom board. The ball and socket connection permits the receiving support to accommodate itself to the position of the bottom board and to equalize instantly the sustaining pressure of the arms 124. As soon as the receiving support has accommodated itself to the presented face of the bottom board, it is locked in place and against movement from the assumed position by the introduction of fluid pressure into the recess 117 behind the stem 118 of the block 119 clamping the ball or sphere 123 tightly in the socket.

The flask parts are now unlocked from the mold support and lowered through the action of the pressure cylinder 101 causing the pattern to be lifted out since it remains a part of or fixed to the mold support.

After the mold has been wholly lowered away from the pattern, the arm 109 is swung out from beneath the mold support and into position to permit the mold to be picked up by a jib crane 131 and carried to the conveyor for advancing it toward the pouring station.

Thereafter the mold support is returned to normal position by again unlocking it from the frame and again manipulating the fluid pressure lift cylinder 76.

It will be understood that the operations described as occurring at the several stations are performed simultaneously, but of course upon different molds, the turret being advanced intermittently and between the periods of operation. This advance of the turret is accomplished by means of a fluid pressure cylinder 141 having a rack 142 affixed to the end of its piston rod 143 and engaging a gear 144 or gear segment held against vertical movement and being freely rotatable under the action of the rack. The gear is disposed about the lower end of a sleeve 140 fast in the frame and embracing the upper end of shaft 21. The sleeve 140 has a narrow sustaining flange 145 at its bottom for holding up the gear 144 in rotatable condition and extends through and is itself rigidly held in a clamp 150. The clamp and sleeve 140 form the bearing 22 already described. A guide 146 carrying a roller 147 is provided to insure accurate operation of the rack. The under face of the gear 144 is provided with a downwardly extending tooth 148. The shaft 21 is adapted to be lifted a desired amount when it is desired to accomplish a turret advance and to this end the bearing 23 at the bottom constitutes a fluid pressure cylinder. The shaft carries near its upper end a collar 151 having three recesses 152 in which the tooth 148 may enter when the shaft is raised. Thereafter the actuation of the fluid pressure cylinder 141 a sufficient amount to impart a one-third rotation of the turret is accomplished. During this one-third rotation the shaft 21 is maintained in elevated position and thereafter the shaft is lowered when the parts have come to rest it being understood that the rack 142 has its idle stroke at this time. A collar 154 is provided near the lower end of the shaft and this collar has recesses 155 in which engages a lug 156 mounted upon the base, the lug 156 serving to insure accurate arrangement of the turret with respect to the operating stations. The lugs 148 and 156 of the collars 151 and 154 are formed and arranged to necessitate automatically the engagement of one lug at the time the other is being disengaged, so that the action is always positive and certain. It will be noted that while the turret is advancing it is held up by a fluid pressure cushion and possibility of jar is greatly reduced.

The molding machine just described is particularly constructed to perform the molding of the drag although it will be manifest that many of its principles may be employed in a machine for forming the cope.

Referring to Fig. 15 we have shown schematically a portion of a foundry equipment designed to permit of a foundry practice upon a closely adjusted cycle of operation. Referring to this figure, reference character 171, indicates a number of trucks progressively movable by step movement about a conveyor system. The molding machine just described and usable in such a system for forming the drag portion of the mold is indicated by reference character 172. The flask parts are delivered or may be delivered by trucks at the station *d*. An overhead crane or carrier 173 is provided to place them on the mold supports of the machine. The completed molds are delivered as has been stated by jib crane indicated in this figure at 174, one such mold being placed on each truck and in position to receive the cope. Reference character 175 indicates a cope molding machine of like construction, the flask parts being brought to it by gravity conveyors 176 and removed from these gravity conveyors by a crane 177 to the supports 178 of the cope machine. From these supports the finished mold is carried by a crane 179 over and placed upon the finished drag molds and the trucks then progressively carry or may carry them past pouring, cooling, and shake-out stations in the closed conveyor system. The advancing movement of the trucks when the plant is operated in this manner should correspond to the turret advances and the arrangement of the steps performed at the several mold forming stations of the machines should be divided into as nearly three equal groups as is practicable. The operations described as occurring at the several operating stations constitutes such a division and the time consumed in performing these operations at each station is substantially the same. An example of the time allowed for the completion of the several groups of molding operations at each period of rest is or may be in the neighborhood of and under forty seconds, where car wheel molds are made.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a molding machine, the combination of a rotatable conveyer movable past a plurality of operating stations and having a plurality of mold supports, and means for alternately locking said conveyer to said rotating means and against movement therewith being substantially overlapping in its locking actions.

2. In a molding machine, the combination of a conveyer movable past a plurality of operating stations, a plurality of mold supports carried by said conveyer, and means advancing said mold supports to said operating stations by a continuous step by step movement, said means having a reciprocating action and an idle stroke said idle stroke occurring while said molds are at rest.

3. In a molding machine, the combination of a conveyer movable past a plurality of operating stations and having a plurality of mold supports carried thereby, means intermittently advancing such supports past said operating stations, and means for yieldingly supporting said conveyer during its advancing movement.

4. In a molding machine, the combination of a conveyer rotatable about a central axis and past a plurality of molding stations, and locking mechanism for supporting and locking the molds, and cushion means yieldingly lifting said conveyer from said conveyer support to permit its advancement.

5. In a molding machine, the combination of a conveyer movable past a plurality of operating stations, a plurality of mold supports carried thereby, fluid pressure means for advancing said conveyer to present the molds successively to said operating stations.

6. In a molding machine, the combination of a conveyer movable past a plurality of operating stations, a plurality of mold supports carried thereby, a rack and pinion for advancing said conveyer for presenting the molds successively to the operating stations, and fluid pressure means for operating said rack and pinion.

7. In a molding machine, the combination of a mold support, a fixed sand feeding mechanism for feeding sand into a mold on the mold support, and laterally swinging means for compressing the sand in the mold while the mold is in sand receiving position.

8. In a molding machine, the combination of a rotatable mold support, a sand feeding mechanism, and a compressor movable independently of said mold support across the path of sand fed into the mold to compress the sand in the mold.

9. In a molding machine, the combination of a rotatable mold support, and a laterally swinging compressor independently of said mold support for compressing sand in the mold.

10. In a molding machine, in combination: a mold support, a sand feeding mechanism for feeding sand into a flask on said mold support, and pivotally mounted and adjustable means for leveling the sand in said flask, said sand leveling means being movable into and out of operative relation with said flask.

11. In a molding machine, the combination of a mold support, a sand feeding mechanism for feeding sand into a flask on said mold support, and pivotally mounted and movable means for striking off surplus sand sustained normally at adjacent operative height and adapted to be moved out of operative relation to said flask.

12. In a molding machine, the combination of a mold support, pivotally mounted compacting means for compressing sand therein, and pivotally mounted means for striking off surplus sand.

13. In a molding machine, the combination of a pivotally mounted mold support upon which a mold may be constructed, means for swinging such support about its pivotal axis, and a second mold support swingably movable into position beneath the mold when inverted.

14. In a molding machine, the combination of a mold carrier, and a pivotal support upon which a mold may be constructed and movable to invert a finished mold, and a second mold support swingably and vertically movable into contact with the inverted mold and downwardly retractable therebeneath to separate the pattern and mold.

15. In a molding machine, the combination of a pivotally mounted mold support upon which a mold may be constructed and movable to invert a finished mold, and a second mold support swingably and vertically movable into contact with the inverted mold and downwardly retractable therebeneath to separate the pattern and mold, and subsequently swingably movable to convey the finished mold from the zone of molding operations.

16. In a molding machine, the combination of a mold support invertible about its own axis after the formation of the mold, a second mold support for engaging the underface of the inverted mold and conformable to the position of the presented underface of said mold, said second support receiving the mold from said first mentioned support and being swingably movable and in conformed condition to separate the pattern and mold.

17. In a molding machine, the combination of a pivotally mounted mold support upon which a mold may be constructed, means for swinging such support about its pivotal axis, and a second mold support swingably movable into position beneath the mold when inverted, said last mentioned mold support having a ball and socket supporting connection and being conformable to the position of the presented face of the mold.

18. In a molding machine, the combination of a pivotally mounted mold support upon which a mold may be constructed, means for swinging such support about its pivotal axis, and a second mold support swingably movable into position beneath the mold when inverted, said last mentioned mold support having a ball and socket supporting connection and being conformable to the position of the presented face of the mold, and means for locking said support in conformed relation.

19. In a molding machine, the combination of a pivotally mounted mold support upon which a mold may be constructed, means for swinging such support about its pivotal axis and a three-point conformable support for receiving the mold from said mold support and a socket providing member in which said support is sustained.

20. In a molding machine, the combination of a pivotally mounted mold support upon which a mold may be constructed, means for swinging such support about its pivotal axis, and a receiving support comprising a three-point member loosely held to permit it to conform to the position of the under face of the mold after inversion for receiving the mold from said mold support, and adapted to be clamped in desired position.

21. In a mold forming machine, the combination of a pivotally mounted mold support upon which a mold may be constructed, means for swinging such support about its pivotal axis, a second swingable mold support for receiving the mold from said first mentioned mold support, and a base connected with said second mentioned support by a universal joint in said base to permit the second mentioned support to conform with the presented surface of the mold.

22. In a molding machine, the combination of a pivotally mounted mold support upon which a mold may be constructed, means for swinging such support about its pivotal axis, a second swingable mold support for receiving the mold from said first mentioned mold support, a base connected with said second mentioned support by a universal joint in said base to permit the second mentioned support to conform with the presented surface of the mold, and means for locking said universal connection against movement after it has conformed to the position of said mold.

23. In a molding machine, the combination of a pivotally mounted mold support upon which a mold may be constructed, means for swinging such support about its pivotal axis, a second mold support for receiving the mold from said first mentioned mold support, a base connected with said second mentioned support by a universal joint to permit the second mentioned support to conform with the presented surface of the mold and fluid pressure means for locking said universal connection against movement after it has conformed to the position of said mold.

24. In a molding machine, the combination of a mold support on which the mold may be formed, and a carrier for transferring the mold from said support, said carrier having a second mold support conformable to the presented surface of the mold and carrying it laterally in its presented position from the first mentioned mold support.

25. In a molding machine, the combination of a mold support on which the mold may be formed, a carrier for receiving the mold from the mold support and having a three-point member on which the mold may be placed, said member being loosely connected in the carrier at the time the mold is received and thereafter locked in place to carry the mold in the presented relation.

26. In a molding machine, the combination of an invertible mold support, means for inverting said mold support and yielding means for cushioning the mold support as it nears the end of an inverting movement.

27. In a molding machine, the combination of an invertible mold support, means for inverting said mold support, and yielding means for cushioning the mold support as it nears the end of an inverting movement and in either direction.

28. In a molding machine, the combination of an inverted mold support, a lock automatically engageable for locking said mold in normal and inverted positions.

29. In a molding machine, the combination of an inverted mold support, a lock for locking said mold in both normal and inverted positions, and cushioning means operable just prior to the engagement of said lock for cushioning the end of the movement of said support.

30. In a molding machine, the combination of an intermittently operating conveyer movable past a plurality of operating stations, a plurality of mold supports carried by it and supported thereon for individual pivotal movement one of said mold supports being provided for each of said stations.

31. In a molding machine, the combination of a conveyer having a plurality of outwardly extending arms upon the tops of which rest a plurality of invertible mold supports.

32. In a molding machine, the combination of a conveyer having a plurality of outwardly extending arms, mold supports having pivot members resting on the top of said arms, and retractable means for holding said mold supports against pivotal movement.

33. In a molding apparatus, the combination of a conveyer movable past a molding machine, a molding machine comprising an invertible mold support, and means for receiving molds from said invertible mold support and transferring them to said conveyer.

34. In a molding apparatus, the combination of a conveyer movable past a molding machine, a molding machine comprising an invertible mold support, and means for receiving molds from said invertible mold support and transferring them to said conveyer, said means comprising a horizontally swinging arm for carrying a finished inverted mold from beneath the mold support, and means for removing the mold from said arm to said conveyer.

35. A molding machine, comprising a rotatable turret having a plurality of sets of outstanding arms adapted to carry molding supports and movable past a plurality of molding stations and a plurality of supports mounted in said arms, said supports corresponding in number to said stations.

36. A molding machine, comprising a rotatable turret having a plurality of sets of outstanding arms adapted to carry molding supports and movable past a plurality of molding stations, and a plurality of supports mounted in said arms, said supports being pivotally mounted in the arms to permit inversion of the supports for the drawing of the pattern, and corresponding in number to said stations.

ALGOT A. WICKLAND.
FREDERICK K. VIAL.